US007492377B2

(12) United States Patent
Edwards et al.

(10) Patent No.: US 7,492,377 B2
(45) Date of Patent: Feb. 17, 2009

(54) DISPLAY DEVICES AND DRIVING METHOD THEREFOR

(75) Inventors: Martin J. Edwards, Crawley (GB); Iain M. Hunter, Brighton (GB); Nigel D. Young, Redhill (GB); Mark T. Johnson, Veldhoven (NL)

(73) Assignee: Chi Mei Optoelectronics Corporation (TW)

(*) Notice: Subject to any disclaimer, the term of this patent is extended or adjusted under 35 U.S.C. 154(b) by 1155 days.

(21) Appl. No.: 10/151,050

(22) Filed: May 20, 2002

(65) Prior Publication Data

US 2002/0175882 A1 Nov. 28, 2002

(30) Foreign Application Priority Data

May 22, 2001 (GB) ................................ 0112395.9

(51) Int. Cl.
*G09G 5/02* (2006.01)
*G06F 15/16* (2006.01)
*G06T 11/20* (2006.01)

(52) U.S. Cl. ........................ 345/694; 345/502; 345/441

(58) Field of Classification Search ................... 345/87, 345/98, 100, 204, 690, 214, 501–506, 502, 345/43, 55, 606, 613, 671, 419, 441, 472.2, 345/694–698

See application file for complete search history.

(56) References Cited

U.S. PATENT DOCUMENTS

| | | | | |
|---|---|---|---|---|
| 5,130,829 | A | 7/1992 | Shannon | 359/59 |
| 5,341,153 | A * | 8/1994 | Benzschawel et al. | 345/694 |
| 5,515,076 | A * | 5/1996 | Thompson et al. | 345/505 |
| 5,523,769 | A | 6/1996 | Lauer et al. | 345/1 |
| 5,545,291 | A | 8/1996 | Smith et al. | 156/655.1 |
| 5,801,715 | A | 9/1998 | Norman | 345/505 |
| 5,945,972 | A * | 8/1999 | Okumura et al. | 345/98 |
| 5,963,210 | A * | 10/1999 | Lewis et al. | 345/419 |
| 6,061,039 | A | 5/2000 | Ryan et al. | 345/55 |
| 6,369,787 | B1 * | 4/2002 | Wu et al. | 345/87 |
| 6,441,829 | B1 * | 8/2002 | Blalock et al. | 345/690 |
| 6,456,281 | B1 * | 9/2002 | Rindal | 345/204 |

OTHER PUBLICATIONS

"Flexible Displays with Fully Integrated Electronics", R.G. Stewart, Conference Record of the 20th IDRC, Sep. 2000, ISSN 1083-1312, pp. 415-418.

* cited by examiner

Primary Examiner—Kevin M Nguyen
(74) *Attorney, Agent, or Firm*—Fish & Richardson P.C.

(57) ABSTRACT

A display device, for example a liquid crystal display device (1), and driving method are provided that avoid the need to provide the display device with display data (e.g. video) containing individual display settings for each pixel. The display device comprises an array of pixels (21-36, 71*a*-79*d*, 121-136) and an array of processing elements (41-48, 71-79, 141-148), each processing element being associated with a respective pixel or group of pixels. The processing elements (41-48, 71-79, 141-148) perform processing of compressed input display data at pixel level. The processing elements (41-48, 71-79, 141-148) decompress the input data to determine individual pixel settings for their associated pixel or pixels. The processing elements (41-48, 71-79, 141-148) then drive the pixels (21-36, 71*a*-79*d*, 121-136) at the individual settings. A processing element may interpolate pixel settings from input data allocated to itself and one or more neighbouring processing elements. Alternatively, the processing elements may have knowledge of the pixel locations of pixels associated with it, and use this information to determine whether one or more of its pixels needs to be driven in response to common input data received by the plural processing elements.

7 Claims, 9 Drawing Sheets

DISPLAY DEVICES AND DRIVING METHOD THEREFOR

The present invention relates to display devices comprising a plurality of pixels, and to driving or addressing methods for such display devices.

Known display devices include liquid crystal, plasma, polymer light emitting diode, organic light emitting diode, field emission, switching mirror, electrophoretic, electrochromic and micro-mechanical display devices. Such devices comprise an array of pixels. In operation, such a display device is addressed or driven with display data (e.g. video) containing individual display settings (e.g. intensity level, often referred to as grey-scale level, and/or colour) for each pixel.

The display data is refreshed for each frame to be displayed. The resulting data rate will depend upon the number of pixels in a display, and the frequency at which frames are provided. Data rates in the 100 MHz range are currently typical.

Conventionally each pixel is provided with its respective display setting by an addressing scheme in which rows of pixels are driven one at a time, and each pixel within that row is provided with its own setting by different data being applied to each column of pixels.

Higher data rates will be required as ever larger and higher resolution display devices are developed. However, higher data rates leads to a number of problems. One problem is that the data rate required to drive a display device may be higher than a bandwidth capability of a link or application providing or forwarding the display data to the display device. Another problem with increased data rates is that driving or addressing circuitry consumes more power, as each pixel setting that needs to be accommodated represents a data transition that consumes power. Yet another problem is that the amount of time to individually address each pixel will increase with increasing numbers of pixels.

The present invention alleviates the above problems by providing display devices and driving methods that avoid the need to provide a display device with display data (e.g. video) containing individual display settings for each pixel.

In a first aspect, the present invention provides a display device comprising a plurality of pixels, and a plurality of processing elements, each processing element being associated with one or more of the pixels. The processing element is adapted to receive compressed input display data, and to process this data to provide decompressed data such that the processing element then drives its associated pixel or pixels at the pixels' respective determined display settings.

In a second aspect, the present invention provides a method of driving a display device of the type described above in the first aspect of the invention.

The processing elements perform processing of the input display data at pixel level.

Compressed data for each processing element may therefore be made to specify input relating to a number of the pixels of the display device, as the processing elements are able to interpret the input data and determine how it relates to the individual pixels it has associated with it.

The compressed data may comprise an image of lower resolution than the resolution of the display device. Under this arrangement display settings are allocated to each of the processing elements based on the lower resolution image. Each processing element also acquires knowledge of the display setting allocated to at least one neighbouring processing element. This knowledge may be obtained by communicating with the neighbouring processing element, or the information may be included in the input data provided to the processing element. The processing elements then expand the input image data to fit the higher resolution display by determining display settings for all of their associated pixels by interpolating values for the pixels based on their allocated display settings and those of the neighbouring processing element(s) whose allocated setting(s) they also know. This allows a decompressed higher resolution image to be displayed from the lower resolution compressed input data.

Alternatively, the processing elements may have knowledge of the pixel locations of pixels associated with it, and use this information to determine whether one or more of its pixels needs to be driven in response to common input data received by the plural processing elements. More particularly, the processing elements may be associated with either one or a plurality of pixels, and also be provided with data specifying or otherwise allowing determination of a location or other address of the associated one or plurality of pixels. Compressed input data may then comprise a specification of one or more objects or features to be displayed and data specifying (or from which the processing elements are able to deduce) those pixels that are required to display the object or feature. The data also includes a specification of the display setting to be displayed at all of the pixels required to display the object or feature. The display setting may comprise grey-scale level, absolute intensity, colour settings etc. The processing elements compare the addresses of the pixels required to display the object or feature with the addresses of their associated pixel or pixels, and for those pixels that match, drives those pixels at the specified display setting. In other words, the processing element decides what each of its pixels is required to display. This approach allows a common input to be provided in parallel to the whole of the display, potentially greatly reducing the required input data rate. Alternatively, the display may be divided into two or more groups of processing elements (and associated pixels), each group being provided with its own common input.

A preferred option for the pixel addresses is to define the pixel addresses in terms of position co-ordinates of the pixels in terms of rows and columns in which they are arrayed, i.e. pixel position co-ordinates, e.g. (x,y) co-ordinates. When the pixels are so identified, the specification of the object or feature to be displayed may advantageously be in the form of various pixel position co-ordinates, which the processing elements may analyse using rules for converting those co-ordinates into shapes to be displayed and positions at which to display those shapes. Another possibility is to indicate predetermined shapes, e.g. ASCI characters, and a position on the display where the character is to be displayed.

The above described and other aspects of the invention will be apparent from and elucidated with reference to the embodiments described hereinafter.

Embodiments of the present invention will now be described, by way of example, with reference to the accompanying drawings, in which.

Figure 1:
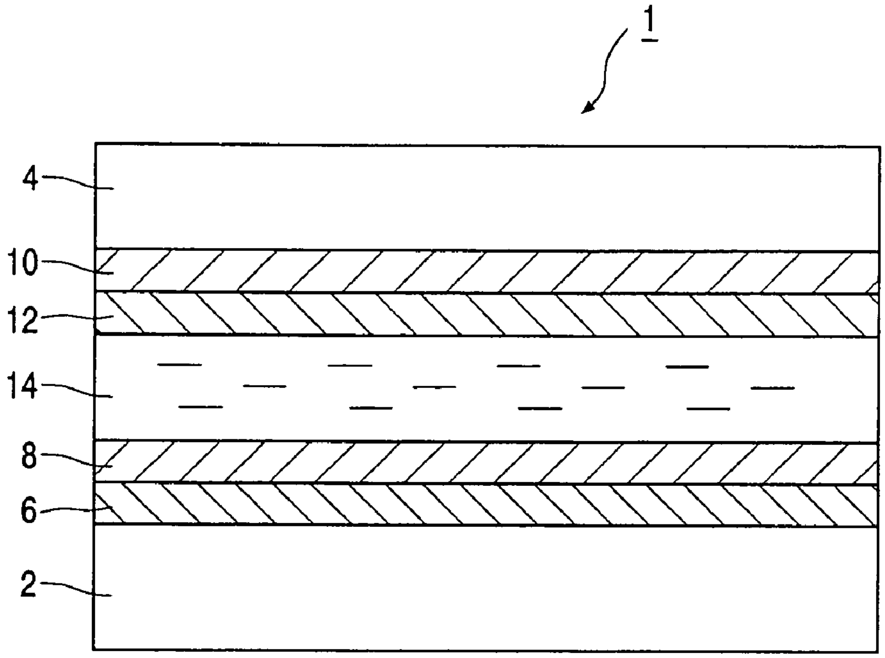
FIG. 1 is a schematic illustration of a liquid crystal display device.
Figure 7A:
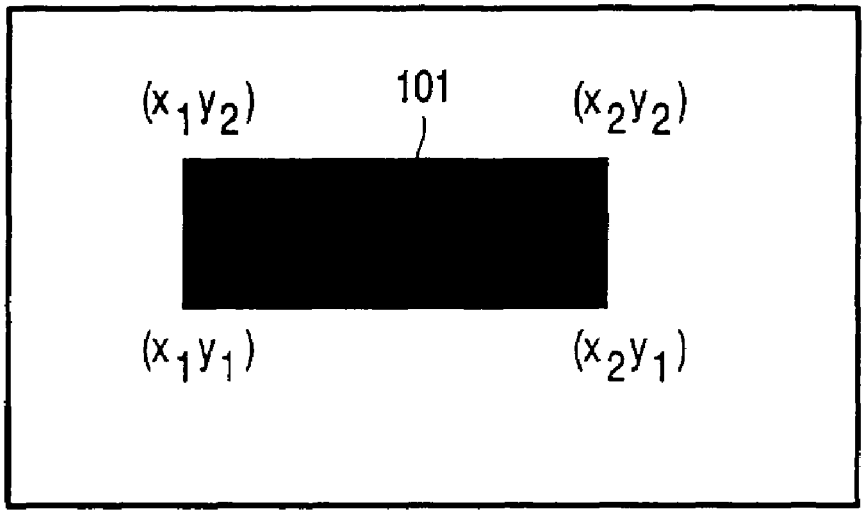
Figure 7B:
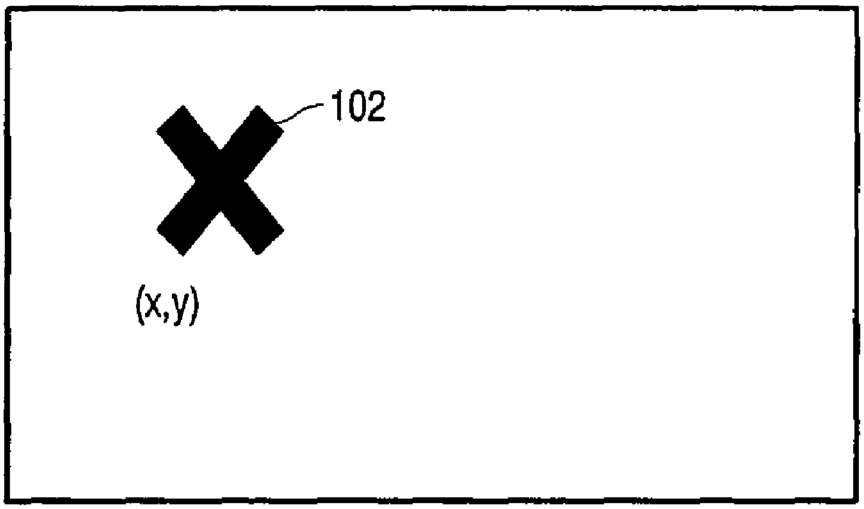
Figure 8:
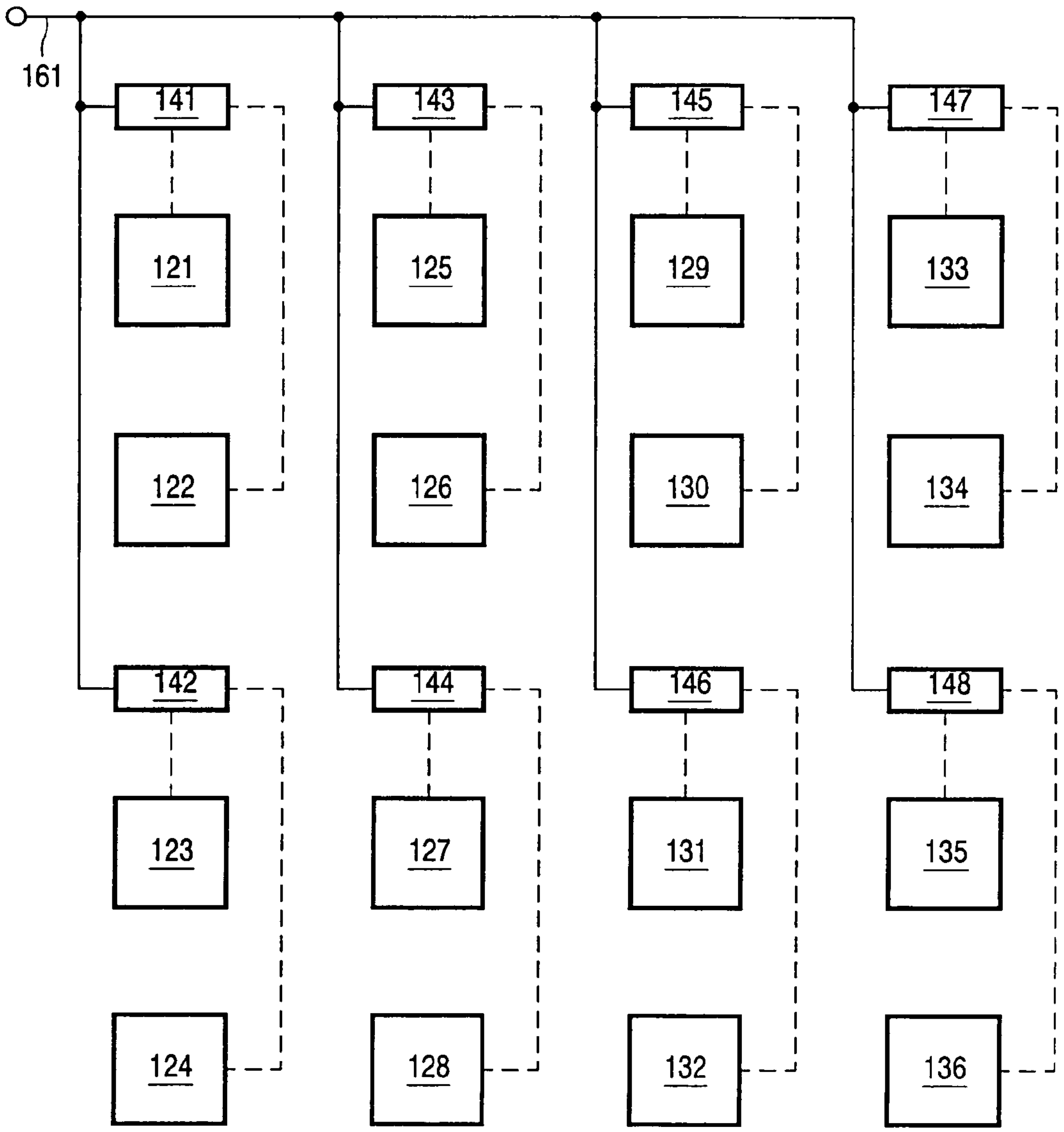
Figure 9:
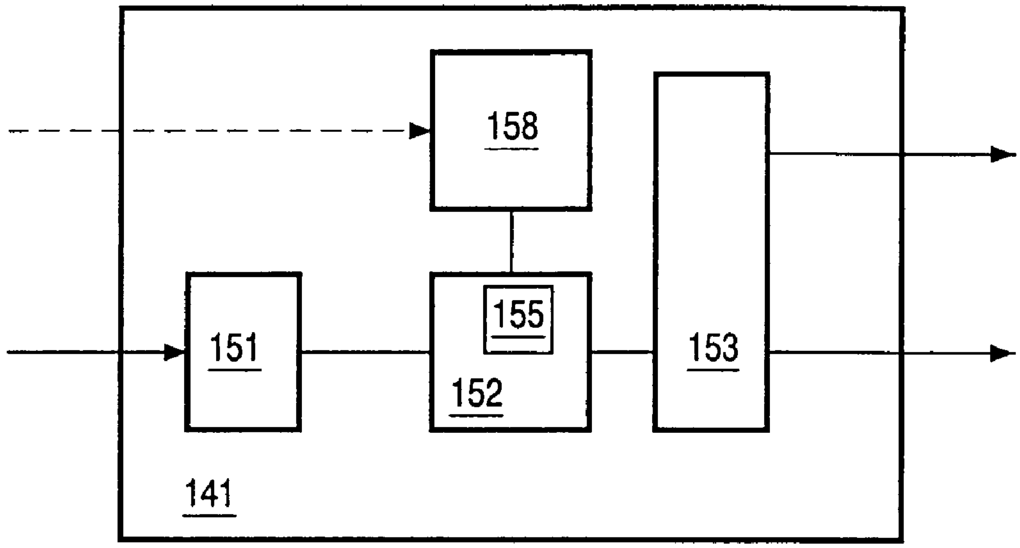
Figure 10:
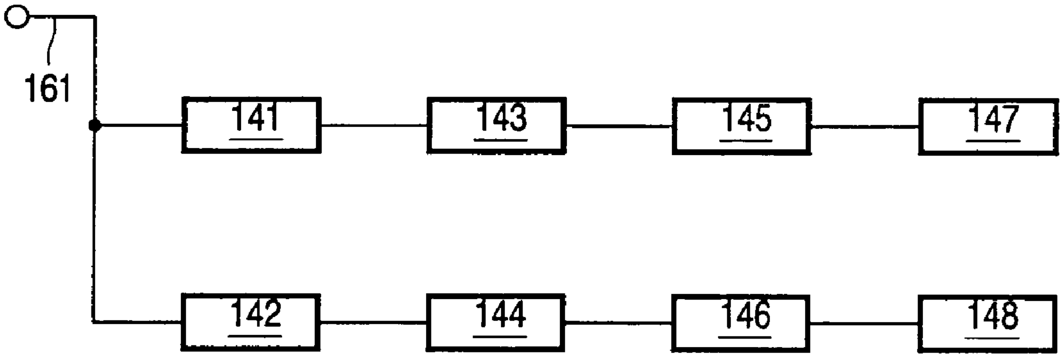
Figure 11:
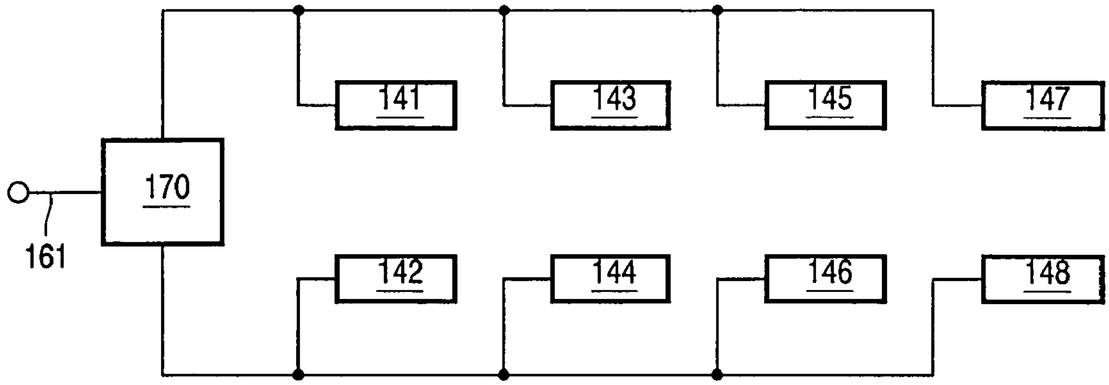
Figure 12:
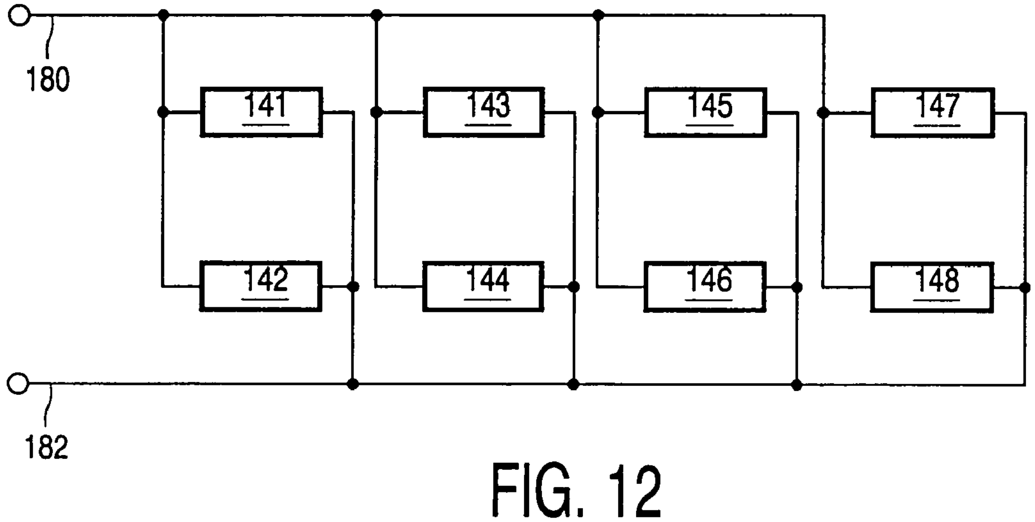

FIG. 7*a* shows a rectangle to be displayed defined by pixel coordinates;

FIG. 7*b* shows a pre-determined character to be displayed whose position is defined by pixel co-ordinates;

FIG. 8 is a schematic illustration of part of another alternative array of processing elements and pixels of an active matrix layer of the display device of FIG. 1;

FIG. 9 is a block diagram schematically illustrating functional modules of another processing element;

FIG. 10 schematically illustrates an arrangement of connections to processing elements;

FIG. 11 schematically illustrates an alternative arrangement of connections to processing elements; and FIG. 12 schematically illustrates another alternative arrangement of connections to processing elements.

FIG. 1 is a schematic illustration (not to scale) of a liquid crystal display device 1, comprising two opposed glass plates 2, 4. The glass plate 2 has an active matrix layer 6, which will be described in more detail below, on its inner surface, and a liquid crystal orientation layer 8 deposited over the active matrix layer 6. The opposing glass plate 4 has a common electrode on its inner surface, and a liquid crystal orientation layer 12 deposited over the common electrode 10. A liquid crystal layer 14 is disposed between the orientation layers 8, 12 of the two glass plates. Except for any active matrix details described below in relation to the pixel driving method of the present embodiment, the structure and operation of the liquid crystal display device 1 is the same as the liquid crystal display device disclosed in U.S. Pat. No. 5,130, 829, the contents of which are contained herein by reference. Furthermore, in the present embodiment the display device 1 is a monochrome display device.

Figure 2:
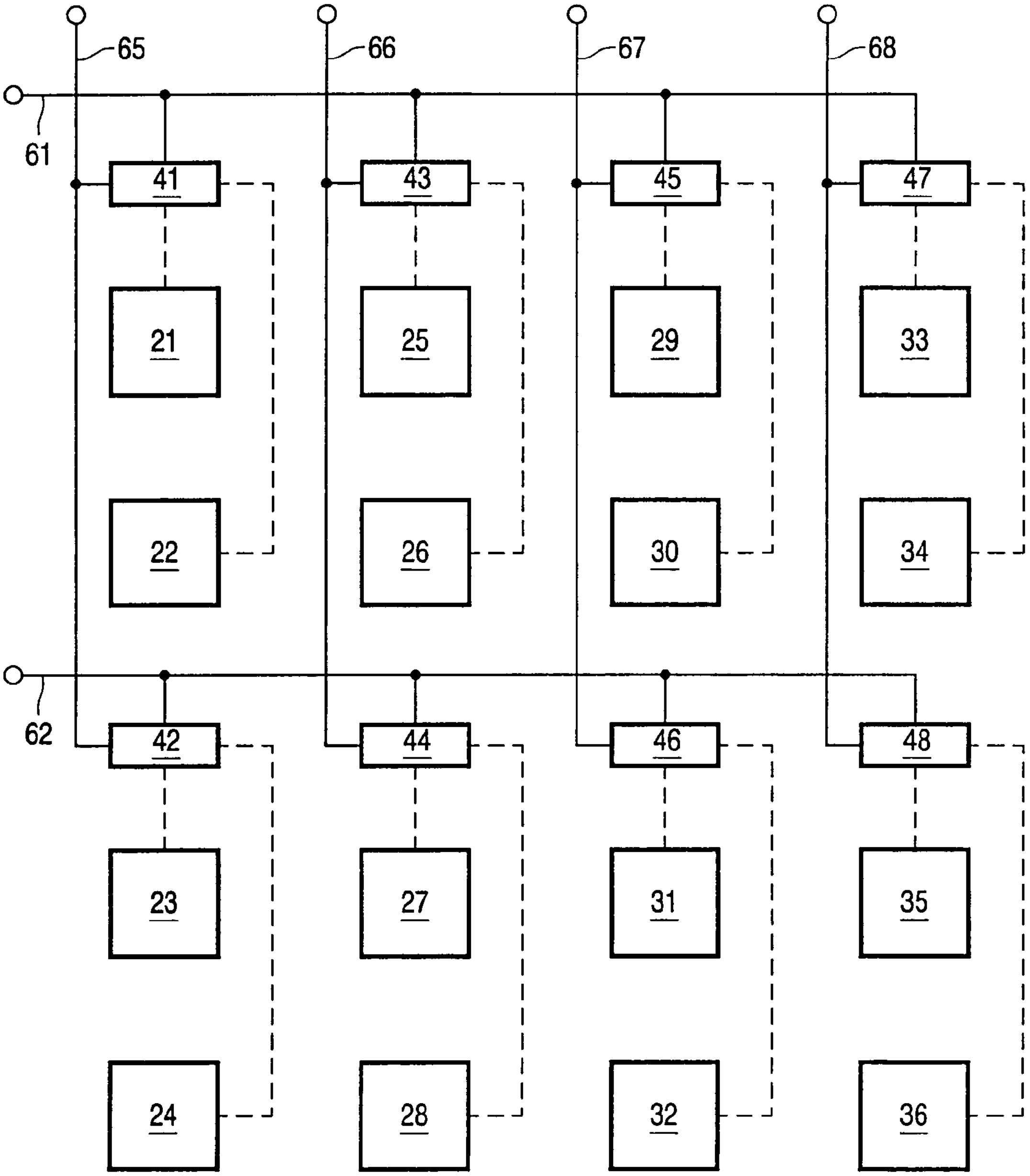
FIG. 2 is a schematic illustration of part of an array of processing elements and pixels of an active matrix layer of the display device of FIG. 1.

Certain details of the active matrix layer 6, relevant to understanding this embodiment, are illustrated schematically in FIG. 2 (not to scale). The active matrix layer 6 comprises an array of pixels. Usually such an array will contain many thousands of pixels, but for simplicity this embodiment will be described in terms of a sample 4×4 portion of the array of pixels 21-36 as shown in FIG. 2.

In any display device, the exact nature of a pixel depends on the type of device. In this example each pixel 21-36 is to be considered as comprising all those elements of the active matrix layer 6 relating to that pixel in particular, i.e. each pixel includes inter-alia, in conventional fashion, a thin-film-transistor and a pixel electrode. In some display devices there may however be more than one thin-film-transistor for each pixel. Also, in some embodiments of the invention, the thin-film-transistors may be omitted if their functionality is instead performed by the processing elements described below.

Also provided as part of the active matrix layer 6 is an array of processing elements 41-48. Each processing element 41-48 is coupled to each of two adjacent (in the column direction) pixels, by connections represented by dotted lines in FIG. 2. A plurality of row address lines 61,62 and column address lines 65-68 are provided for delivering input data to the processing elements 41-48. In conventional display devices one row address line would be provided for each row of pixels, and one column address line would be provided for each column of pixels, such that each pixel would be connected to one row address line and one column address line. However, in the active matrix layer 6, one row address line 61,62 is provided for each row of processing elements 41-48, and one column address line 65-68 is provided for each column of processing elements 41-48, such that each processing element 41-48 (rather than each pixel 21-36) is connected to one row address line and one column address line, as shown in FIG. 2.

In operation, each processing element 41-48 receives input data from which it determines at what level to drive each of the two pixels coupled to it, as will be described in more detail below. Consequently, the rate at which data must be supplied to the display device 1 from an external source is halved, and likewise the number of row address lines required is halved.

Figure 3:
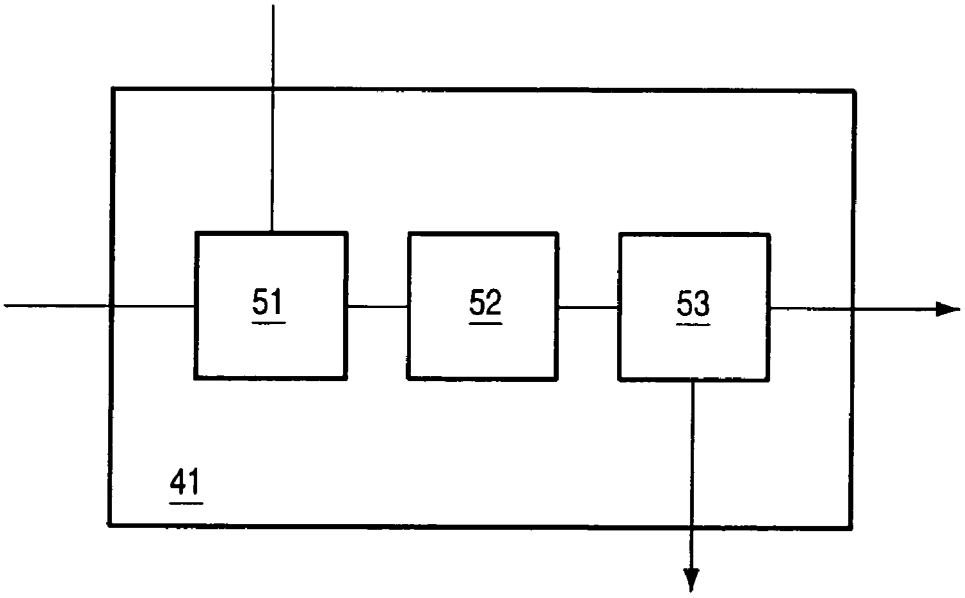
FIG. 3 is a block diagram schematically illustrating functional modules of a processing element.

By way of example, the functionality and operation of the processing element 41 will now be described, but the following description corresponds to each of the processing elements 41-48. FIG. 3 is a block diagram schematically illustrating functional modules of the processing element 41. The processing element 41 comprises an input module 51, for receiving the input data provided in combination by signals on the row address line 61 and the column address line 65. The processing element 41 further comprises a processor 52. In operation, the processor 52 determines at which level to drive each of the two pixels coupled to it, i.e. pixels 21 and 22. The processing element 41 also comprises a pixel driver 53 that in operation outputs the determined driving signals to the pixels 21 and 22.

Figure 4:
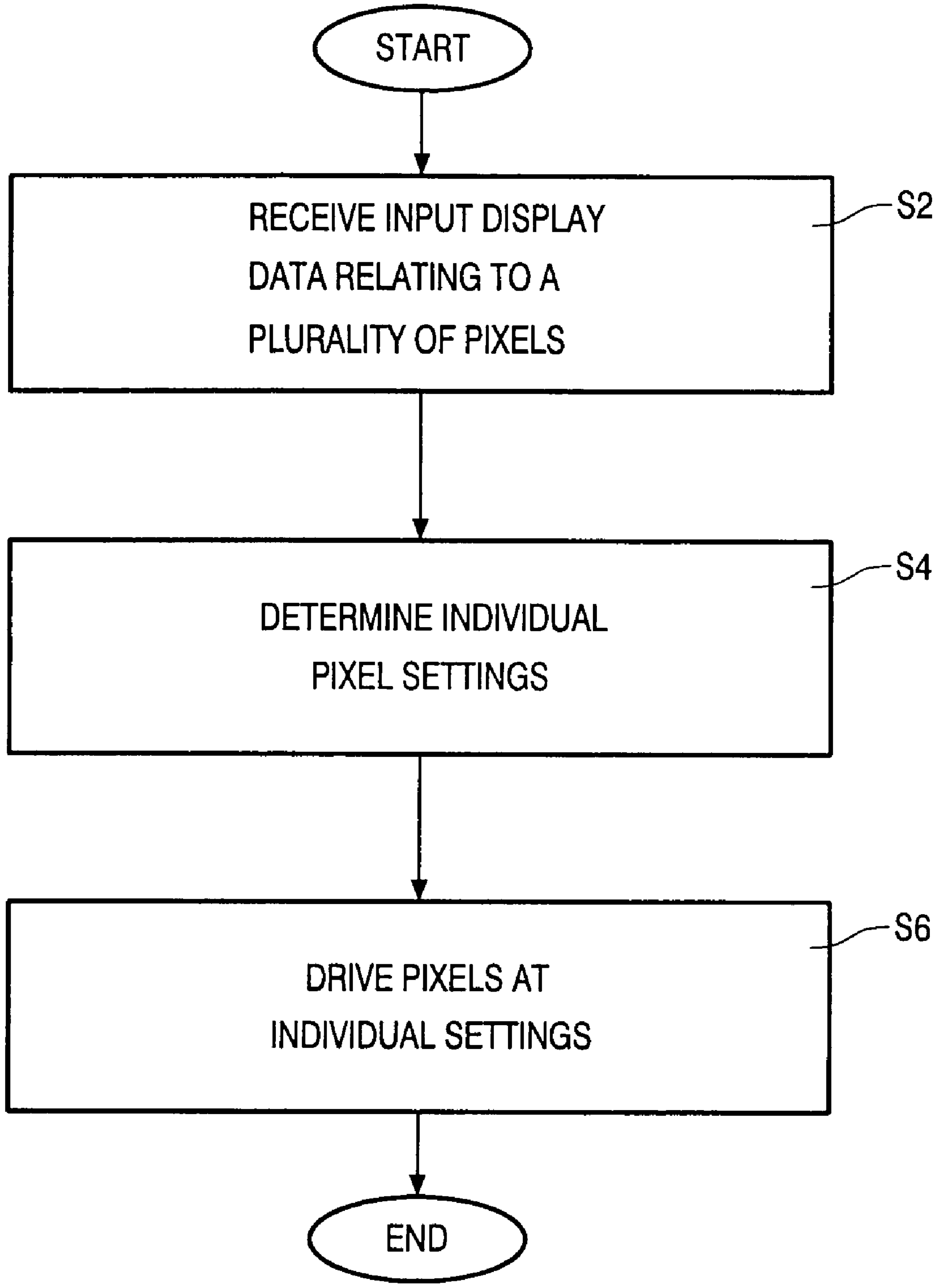
FIG. 4 is a flowchart showing process steps carried out by the processing element of FIG. 4 in a display driving process.

FIG. 4 is a flowchart showing process steps carried out by the processing element 41 in this embodiment. At step s2, the input 51 of the processing element 41 receives input display data from a display driver coupled to the display device 1. The input display data comprises a display setting (which in this example of a monochrome display consists of just a grey-scale setting) for the processing element 41 itself. In addition, the input display data comprises a display setting for the processing element adjacent in the column direction, i.e. processing element 42. This input display data relates to both the pixels 21, 22 associated with the processing element 41 in that the processing element 41 will use this data to determine the display settings to be applied to each of those pixels.

At step s4, the processor 52 of the processing element 41 determines individual display settings for the pixels 21, 22 by interpolating between the value for the processing element 41 itself and the value for the adjacent processing element 42. Any appropriate algorithm for the interpolation process may be employed. In this embodiment, the driving level determined for the pixel next to the processing element 41, i.e. pixel 21, is that of a grey-scale (i.e.) intensity level equal to the setting for the processing element 41, and the driving level interpolated for the other pixel, i.e. pixel 22, is a value equal to the average of the setting for the processing element 41 and the setting for the neighbouring processing element 42.

At step s6, the processing element 41 drives the pixels 21 and 22, at the settings determined during step s4, by means of the pixel driver 53.

In this example, two pixels are driven at individual pixel settings in response to one item of input data. Thus the displayed image may be considered as a decompressed image displayed from compressed input data. The input data may be in a form corresponding to a smaller number of pixels than the number of pixels of the display device 1, in which case the above described process may be considered as one in which the image is expanded from a "lesser number of pixels" format into a "larger number of pixels" format (i.e. higher resolution), for example displaying a video graphics array (VGA) resolution image on an extended graphics array (XGA) resolution display.

Another possibility is that the data originally corresponds to the same number of pixels as are present on the display device 1, and is then compressed prior to transmission to the display device 1 over a link of limited data rate or bandwidth.

In this case the data is compressed into a form consistent with the interpolation algorithm to be used by the display device 1 for decompressing the data.

The above described arrangement is a relatively simple one in which interpolation is performed in only one direction. More elaborate arrangements provide even greater multiples of data rate savings. One embodiment is illustrated schematically in FIG. 5 (not to scale), which shows a portion of another pixel and processing element array. In this example, processing elements 71-79 are arranged in an array of rows and columns as shown. Each processing element is coupled (by connections which are not shown) to four symmetrical pixels [71*a*-*d*]-[79*a*-*d*] arranged around the processing element as shown. In addition, dedicated connections (not shown), which will be described in more detail below, are provided between neighbouring processing elements.

In this embodiment, the input display data received by each processing element 71-79 comprises only the setting (or level) for that particular processing element 71-79. Each processing element 71-79 separately obtains the respective settings of neighbouring processing elements by communicating directly with those neighbouring processing elements over the above mentioned dedicated connections.

Again, various interpolation algorithms may be employed. One possible algorithm is as follows.

If we label the received data settings for the processing elements 75, 76, 79 and 78 as W, X, Y and Z respectively, the interpolated display values for the following pixels are:

pixel 75*c*=(6W+X+Z)/8 pixel 76*d*=(6X+W+Y)/8 pixel 79*a*=(6Y+X+Z)/8 pixel 78*b*=(6Z+W+Y)/8

This provides a weighted interpolation in which a given pixel is driven at a level primarily determined by the setting of the processing element it is associated with, but with the driving level adjusted to take some account of the settings of the processing elements closest to it in each of the row and column directions. The overall algorithm comprises the above principles and weighting factors applied across the whole array of processing elements.

The algorithm is adjusted to accommodate the pixels at the edges of the array. If the array portion shown in FIG. 5 is at the bottom right hand corner of an overall array, such that processing elements 73, 76, 79, 78 and 77 are all along edges of the array, then the interpolated display values for the following pixels are:

pixel 76*c*=(3X+Y)/4 pixel 79*b*=(3Y+X)/4 pixel 79*c*=Y and so on.

Further details of the processing elements 41-48, 71-76 of the above embodiments will now be described. The processing elements are small-scale electronic circuits that may be provided using any suitable form of multilayer/semiconductor fabrication technology, including p-Si technology. Likewise, any suitable or convenient layer construction and geometrical layout of processor parts may be employed, in particular taking account of the materials and layers being used anyway for fabrication of the other (conventional) constituent parts of the display device. However, in the above embodiments, the processing elements are formed from CMOS transistors provided by a process known as "NanoBlock ™ IC and Fluidic Self Assembly" (FSA), which is described in U.S. Pat. No. 5,545,291 and "Flexible Displays with Fully Integrated Electronics", R. G. Stewart, Conference Record of the 20th IDRC, September 2000, ISSN 1083-1312, pages 415-418, both of which are incorporated herein by reference. This is advantageous because this method is particularly suited to producing very small components of the same scale as typical display pixels.

Figure 5:
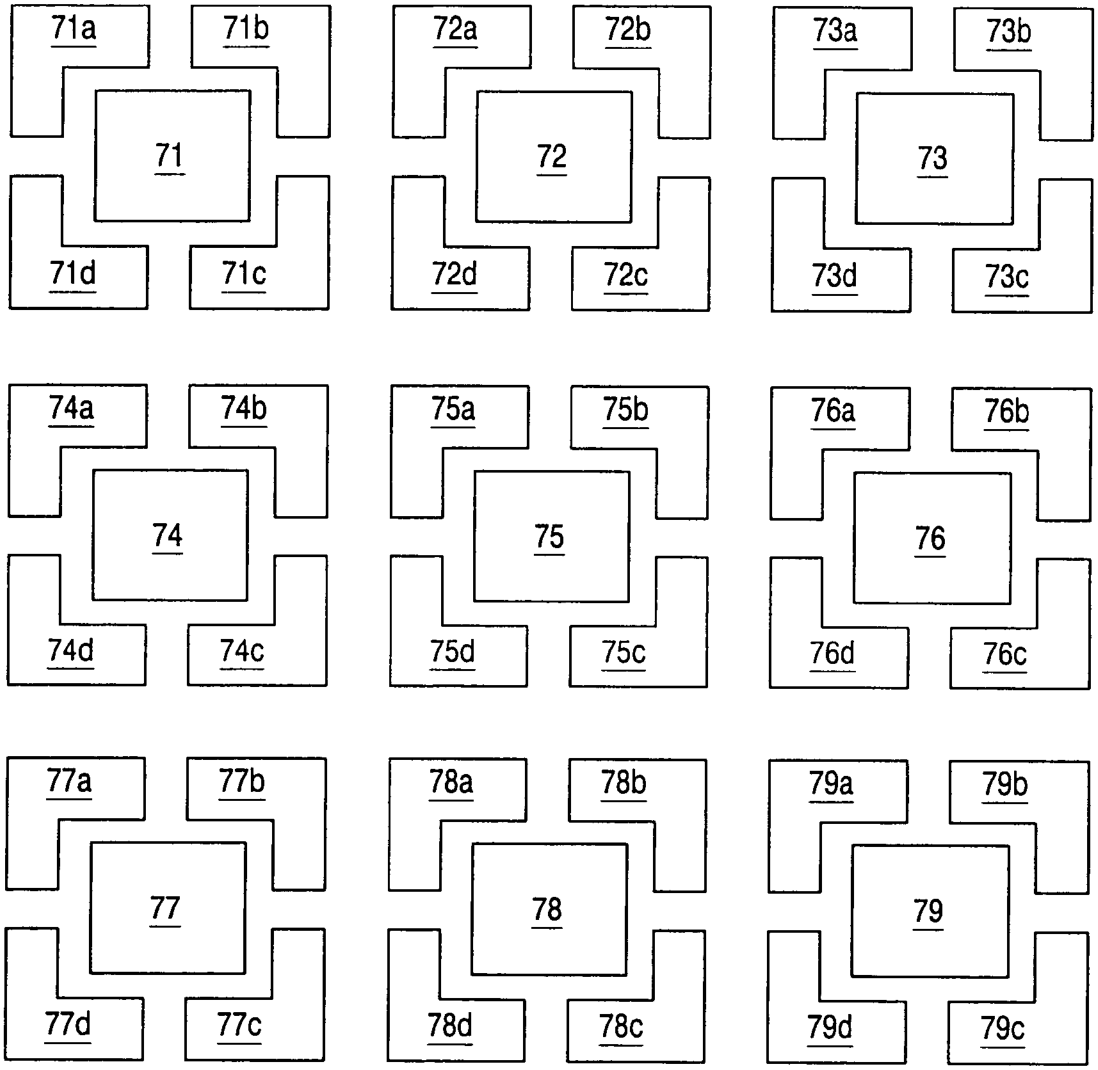
FIG. 5 is a schematic illustration of part of an alternative array of processing elements and pixels of an active matrix layer of the display device of FIG. 1.
Figure 6:
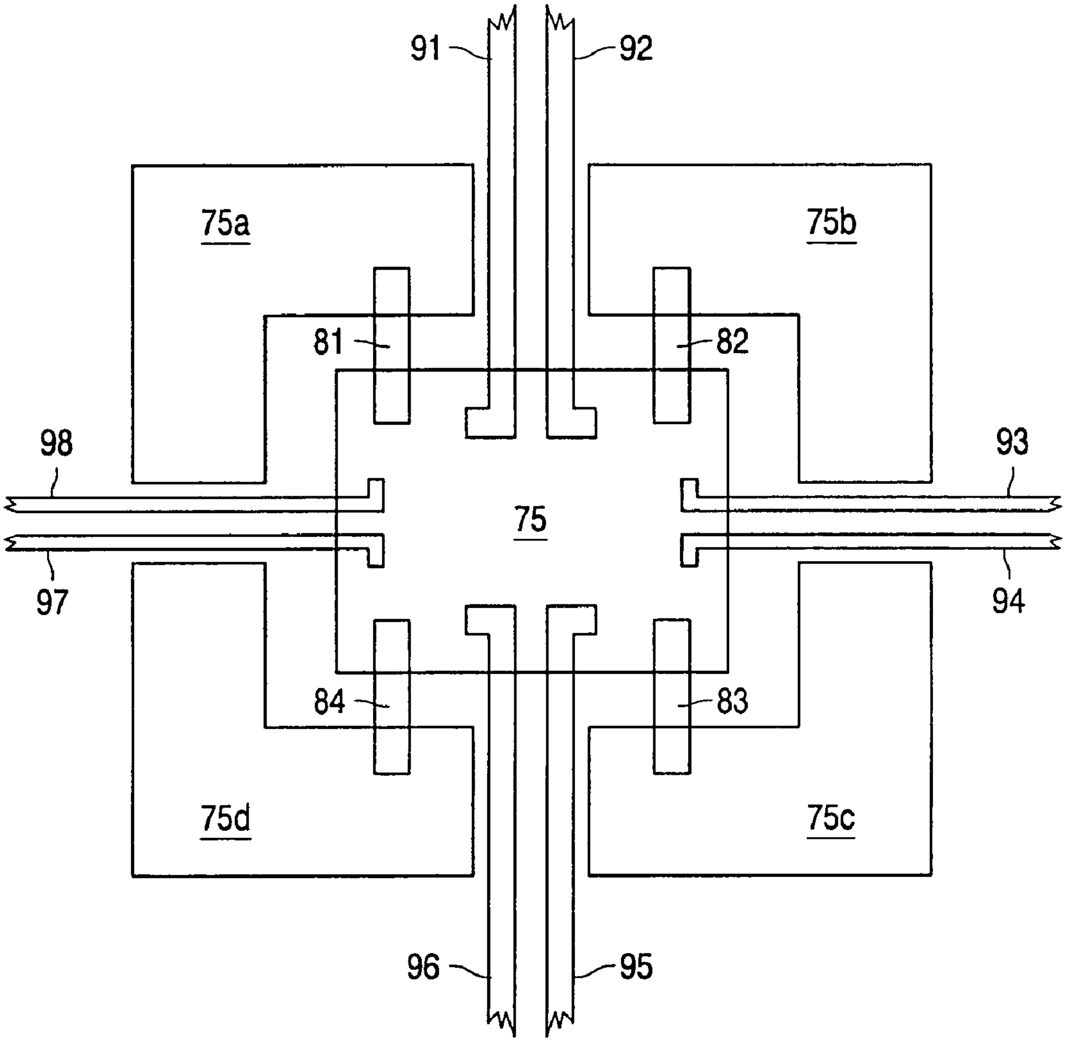
FIG. 6 shows a layout (not to scale) for a processing element and associated pixels.

By way of example, a suitable layout (not to scale) for the processing element 75 and associated pixels 75*a*-*d* of the array of FIG. 5 is shown in FIG. 6. The processing element 75 and thin film transistors of the pixels 75*a*-*d* are formed by the above mentioned FSA process (or alternatively, the thin film transistor may be omitted if the corresponding functionality is provided by the processing element). The display shapes of the pixels 75*a*-*d* are defined by the shape of the pixel electrodes thereof. Pixel contacts 81-84 are provided between the processing element 75 and the respective pixels 75*a*-*d*.

Data lead pairs are provided from the processing element 75 to each of the neighbouring processing elements of the array of FIG. 5, i.e. data leads 91 and 92 connect with processing element 72, data leads 93 and 94 connect with processing element 76, data leads 95 and 96 connect with processing element 78, and data leads 97 and 98 connect with processing element 74. As described earlier, these data leads allow the processing element to communicate with its neighbouring processing elements to determine the input display settings of those neighbouring processing elements. In this example, the data leads 91-98 (and corresponding data leads of the other processing elements) effectively surround each processing element, and hence the column and row addressing lines (not shown) for this array of processing elements are provided at a different layer of the thin film multilayer structure of the active matrix layer 6. In the case of the embodiment shown in FIG. 2, since each processing element is directly provided with the data setting for the neighbouring processing element, data lines corresponding to data leads 91-98 are not employed, hence the row and column address lines (represented by full lines in FIG. 2) and the connections between the processing elements and the pixels (represented by dotted lines in FIG. 2) may be formed from the same thin film layer, if this is desirable or convenient.

In the above embodiments the processing elements are opaque, and hence not available as display regions in a transmissive device. Thus the arrangement shown in FIGS. 4 and 5 is an example that is particularly suited for a transmissive display device, as the available display area around, for example, the opaque processing element 75, is efficiently used due to the shapes and layout of the pixels 75*a*-*d*.

In the case of reflective display devices, a further possibility is to provide a pixel directly over the processing element, e.g. in the case of the FIG. 6 arrangement a further pixel may be provided over the area of the processing element 75. For such a case, one convenient way of adapting the interpolation algorithm is to set the pixel overlying the processing element equal to the setting of the processing element.

In the above embodiments the display device 1 is a monochrome display, i.e. the variable required for the individual pixel settings is either on/off, or, in the case of a grey-scale display, the grey-scale or intensity level. However, in other embodiments the display device may be a colour display device, in which case the individual pixel display settings will also include a specification of which colour is to be displayed.

The interpolation algorithm may be adapted to accommodate colour as a variable in any appropriate manner. One simple possibility is for the colour of all pixels associated with a given processing element to be driven at the colour specified in the display setting of that processing element. For example, in the case of the arrangement shown in FIG. 2, both pixels 21 and 22 would be driven at the colour specified in the input data for the processing element 41. An advantage of this algorithm is that it is simple to implement. A disadvantage is that although pixel 22 has been "blended in" in terms of intensity between pixels 21 and 23, this is not be the case for the colour property of the displayed image.

More complex algorithms may provide for the colour to be "blended in" also. One possibility, when the colours are specified by co-ordinates on a colour chart, is for the average of the respective colour co-ordinates specified to the processing elements 41 and 42 to be applied to the pixel 22 (in the FIG. 2 arrangement). In the case of weighted interpolation algorithms such as the example given above for the arrangement of FIG. 5, such colour coordinates may also be subjected to a weighted interpolation algorithm.

Yet another possibility is for a look-up table to be stored and employed at each processing element for the purpose of determining interpolated colour settings. Again referring to the arrangement of FIG. 2 by way of example, the processing element 41 would have a look-up table specifying the colour at which to drive the pixel 22 as a function of combinations of the colour specified for the processing element 41 and the colour specified for the processing element 42.

It will be apparent from the above embodiments that a number of design options are available to a skilled person, such as:

(i) the manufacturing process for the processing elements;
(ii) the number and geometrical arrangement of pixels associated with each processing element;
(iii) whether a pixel is located over a processing element;
(iv) how a processing element acquires knowledge of the data setting of neighbouring processing elements (required for the interpolation process);
(v) the form of the interpolation algorithm, with respect to intensity and/or colour.

It is emphasised that the particular selections with respect to these design options contained in the above embodiments are merely exemplary, and in other embodiments other selections of each design option, in any compatible combination, may be implemented.

The above described embodiments may be termed "interpolation" embodiments as they all involve interpolation to determine certain pixel display settings. A further range of embodiments, which may conveniently be termed "position" embodiments, will now be described.

To summarise, each processing element is associated with one or more particular pixels. Each processing element is aware of its position, or the position of the pixel(s) it is associated with, in the array of processing elements or pixels. As in the embodiments described above, the processing elements are again used to analyse input data to determine individual pixel display settings. However, in the position embodiments, the input display data is in a generalised form applicable to all (or at lease a plurality) of the processing elements. The processing elements analyse the generalised input data to determine whether its associated pixel or pixels need to be driven to contribute to displaying the image information contained in the generalised input data.

The generalised input data may be in any one or any combination of a variety of formats. One possibility is that the pixels of the display are identified in terms of pixel array (x,y) coordinates. An example of when a rectangle 101 is to be displayed is represented schematically in FIG. 7*a*. The input data is provided in the form of four sets of pixel array (x,y) coordinates specifying the corner positions of the rectangle, an intensity setting for the rectangle (if the display device offers grey scale capability), and a colour for the rectangle (if the display device is a colour display device). This data is input to all the processing elements of the display device. The processing elements are provided with rules that they use to determine how to join specified pixel array (x,y) coordinates. For example, the rules may specify that when three sets of co-ordinates are supplied, a triangle should be formed, and when four sets are provided, a rectangle should be formed, and so on. Alternatively, further encoding may be included in the input data, indicating how co-ordinates should be joined, e.g. whether by predetermined curves or by straight lines. Each processing element compares the positions of the its associated pixels with the pixels requiring to be driven to display the rectangle, and subsequently drives such pixels if required.

Another possibility for the format of the input data is for a predefined character to be specified, for example a letter "x" 102 as represented schematically in FIG. 7*b*. The input data is provided in the form of one set of co-ordinates specifying the position of the letter x within the pixel array (i.e. the position of a predetermined part of the letter x or a standardised character "envelope" for it), the size of the letter x, and again an intensity setting (if the display device offers grey-scale capability) and a colour for the rectangle (if the display device is a colour display device).

By performing the processing described in the two preceding paragraphs at the processing elements, the requirement to externally drive the display device with separate data for each pixel is removed. Instead, common input data can be provided to all the processing elements, considerably simplifying the data input process and reducing bandwidth requirements.

FIG. 8 is a schematic illustration (not to scale) of a 4×4 portion of an array of pixels 121-136 of the active matrix layer 6 of one particular position embodiment that will now be described. Unless otherwise stated, details of the liquid crystal display device of this embodiment are the same as for the liquid crystal display device 1 described in relation to the earlier interpolation embodiments. An array of processing elements 141-148 is also provided. Each processing element 141-148 is coupled to two of the pixels, by connections represented by dotted lines. As explained above, in this embodiment the properties of the processing elements 141-148 allow common input data to be provided to all the processing elements. A single data input line 161 is provided and connected in parallel to all the processing elements 141-148, as shown in FIG. 8.

By way of example, the functionality and operation of the processing element 141 will now be described, but the following description corresponds to each of the processing elements 141-148. FIG. 9 is a block diagram schematically illustrating functional modules of the processing element 141. The processing element 141 comprises an input module 151, for receiving the input signal provided on the data input line 161. The processing element 141 also comprises a position memory 158, which stores position data identifying the (x,y) co-ordinates of the pixels 121 and 122 (the position data may alternatively identify the array location of the processing element 141 itself, allowing determination of the (x,y) co-ordinates of the pixels 121 and 122). The processing element 141 further comprises a processor 152, which itself comprises a comparator 155. In operation, the processor 152 performs the above mentioned determination of the level at which to drive each of the two pixels coupled to it, i.e. pixels 21 and 22. The processing element 41 also comprises a pixel driver 153.

The process steps carried out by the processing element 141 in this embodiment correspond to those outlined in the flowchart of FIG. 4 for the earlier described embodiments. Referring again to FIG. 4, at step s2, the input 151 of the processing element 141 receives input display data from a display driver coupled to the display device 1. In this embodiment the input display data comprises data specifying one or more image objects to be displayed. The image objects are specified in terms of (x,y) coordinates and other parameters as explained above with reference to FIGS. 7*a* and 7*b*. In order to specify large or intricate images, the image may be specified for example in terms of a plurality of polygons building up a required shape. Alternatively or in addition, set characters, such as ASCI characters, along with position vectors, may be specified. Indeed, any suitable conventional method of image definition, as used for example in computer graphics/video cards, may be employed. This input display data thus relates to the plural pixels required to display the image object.

At step s4, the processor 152 of the processing element 141 determines individual display settings for the pixels 21, 22 by using the comparator 155 to compare the pixel co-ordinates required to be driven according to the received specification of image with the pixel co-ordinates of the pixels 121 and 122.

At step s6, the processing element 41 drives pixel 21 and/or pixel 22, at the pixel display setting, i.e. intensity and/or colour level, specified in the input image data, if required by the outcome of the above described comparison process.

It will be appreciated that the input data in this embodiment represents compressed data because image objects covering a large number of pixels can be defined simply and without the need to specify the setting of each individual pixel. As a result, for display devices of say 1024×768 pixels, data rates as low as a few kHz may be applied instead of 100 MHz.

In this embodiment, all the processing elements 141-148 are connected in parallel to the single data input line 161. However, a number of alternatives are possible. FIG. 10 schematically illustrates an alternative arrangement of connections to the processing elements 141-148 (for clarity the pixels are omitted in this Figure). A single data input line 161 is again provided, but this then splits as the processing elements 141-148 are arranged in two serially connected chains, with the processing elements (except for the ones at the end of each series chain) each having an output connection in addition to the earlier described input connection. This allows information to be buffered within each processing element 141-148, providing a possible reduction in signal degradation compared to transmission of the data along long lines in large area displays without buffering.

FIG. 11 schematically illustrates another alternative arrangement of connections to the processing elements 141-148. In this arrangement input image data for the whole pixel array is initially provided at a single data input line 161, but is then input to a pre-processor 170. The pre-processor has two separate outputs, one connected to the first row of processing elements 141, 143, 145, 147 and one connected to the second row of processing elements 142,144,146,148. The pre-processor 170 analyses the input data and only forwards to each row of processing elements that input data which specifies objects to be displayed which lay in the area of the pixel array associated with that row of processing elements. In other more complicated or larger arrays the number of outputs from the pre-processor may be selected as required. Another possibility is that the input data as provided is already split according to different regions of the pixel array, in which case separate direct inputs may be provided to each corresponding group of processing elements.

FIG. 12 schematically illustrates another alternative arrangement of connections to the processing elements 141-148. In this arrangement input image data is provided in two component parts. The first part specifies the display setting (e.g. intensity and/or colour). This data is input to the processing elements via a display settings input line 180 that is connected in parallel to each of the processing elements 141-148. The second part of the input data is position data specifying the pixels that are to display the display setting. This position data is input to the processing elements via a position input line 182 that is also connected in parallel to each of the processing elements 141-148. For this connection arrangement, the arrangement of functional modules of each processing element is as described earlier with reference to FIG. 9, except that the comparator 155 is not included in the processor 152 and the position memory 158 is modified as follows. The position memory 158 is replaced by a position processing module that not only stores the positions of the associated pixels, but also serves as an input for the position input line 182 shown in FIG. 12. The position processing module further comprises a comparator that performs the comparison of the pixel positions required to be displayed with the pixel positions of the pixels associated with the processing element. If one or more of the pixels associated with the processing element correspond to the image pixel positions, then the relevant pixel identities are forwarded to the processor 152 which attaches the data settings received in the basic input 151 and forwards this to the pixel driver 153 for driving the relevant pixel or pixels.

In the above position embodiments, the positions of the pixels are specified in terms of (x,y) co-ordinates. Individual pixels may however alternatively be specified or identified using other schemes. For example, each pixel may simply be identified by a unique number or other code, i.e. each pixel has a unique address. The address need not be allocated in accordance with the position of the pixel. The input data then specifies the pixel addresses of those pixels required to be displayed. If the pixel addresses are allocated in a systematic numerical order relating to the positions of the pixels, then the input data may when possible be further compressed by specifying just end pixels of sets of consecutive pixels to be displayed.

All of the position embodiments described above represent relatively simple geometrical arrangements. It will be appreciated however that far more complex arrangements may be employed. For example, the number of pixels associated with each processing element may be more than 2, for example four pixels may be associated with each processing element, and arranged in the same layout as that of the interpolation embodiment shown in FIGS. 5 and 6. As was the case with the earlier described interpolation embodiments, a further pixel may be positioned over the processing element in the case of a reflective display device.

Another possibility is to have only one pixel associated with each processing element. In this case, in reflective display devices each pixel may be positioned over its respective processing element.

Except for any particular details described above with reference to FIGS. 7 to 12, fabrication details and other details of the processing elements and other elements of the display device 1 of the position embodiments are the same as those of the interpolation embodiments described earlier with reference to FIGS. 2 to 6.

Although the above interpolation and position embodiments all implement the invention in a liquid crystal display device, it will be appreciated that these embodiments are by way of example only, and the invention may alternatively be implemented in any other form of display device allowing processing elements to be associated with pixels, including, for example, plasma, polymer light emitting diode, organic light emitting diode, field emission, switching mirror, electrophoretic, electrochromic and micro-mechanical display devices.

The invention claimed is:

1. A display device, comprising:

an array of pixels; and an array of processing elements, each associated with a respective group of pixels;

wherein each processing element comprises:

an input for receiving input display data relating to a plurality of the pixels and comprising a display setting for the processing element;

a processor for processing received input display data to determine individual pixel data for each of the group of pixels associated with the processing element, said processor being adapted to process the received input display data by interpolating the individual pixel data for each pixel of the associated group of pixels from the display setting for the processing element and a display setting or settings from respectively one or a plurality of neighboring processing elements; and a pixel driver for driving the associated pixel or each pixel of the associated group of pixels with that pixel's determined individual pixel data.

2. A device according to claim 1, wherein the processing element comprises means for communicating with the one or the plurality of neighboring processing elements to acquire the display setting or settings for the one or the plurality of neighboring processing elements.

3. A device according to claim 1, wherein the input of each processing element is adapted to receive display data comprising the display setting for the processing element and the display setting or settings for the one or the plurality of neighboring processing elements.

4. A method of driving a display device comprising an array of pixels; the method comprising:

receiving input display data, relating to a plurality of the pixels, at a processing element associated with a group of the pixels, the input display data comprising a display setting for the processing element;

the processing element processing the received input display data to determine individual pixel data for each pixel of the associated group of pixels by interpolating the individual pixel data for each pixel of the associated group of pixels from the display setting for the processing element and a display setting or settings from respectively one or a plurality of neighboring processing elements each associated with a respective further group of pixels; and the processing element driving the associated pixel or each pixel of the associated group of pixels with that pixel's determined individual pixel data.

5. A method according to claim 4, wherein the processing element acquires the display setting or settings for the one or the plurality of neighboring processing elements by communicating with the one or the plurality of neighboring processing elements.

6. A method according to claim 4, wherein the display setting or settings for the one or the plurality of neighboring processing elements is provided to the processing element as part of the input display data.

7. A display device, comprising:

an array of pixels; and an array of processing elements, each associated with a respective pixel or group of pixels;

wherein each processing element comprises:

an input for receiving input display data relating to a plurality of the pixels, the input display data comprising a specification including specified pixel array co-ordinates, pixel addresses, and a display setting, specifying a feature to be displayed;

a memory for receiving and storing pixel addresses of the pixel or group of pixels associated with the processing element, said memory being adapted to receive and store pixel addresses in the form of pixel array co-ordinates;

a processor for processing the received input display data to determine individual pixel data for the pixel or for each of the group of pixels associated with the processing element, said processor including a comparator for comparing the pixel addresses specifying the feature to be displayed with the pixel addresses of the pixel or group of pixels associated with the processing element and being adapted to determine the individual pixel data of the associated pixel or each pixel of the associated group of pixels as the specified display setting if the pixel address of the respective pixel corresponds with a specified pixel address of the feature to be displayed, and being arranged to consider the pixel address of the respective pixel as corresponding with the specified pixel address of the feature to be displayed if the respective pixel lies within the specified shape at the specified position in the pixel array; and a pixel driver for driving the associated pixel or each pixel of the associated group of pixels with that pixel's determined individual pixel data, and wherein each processing element is provided with rules for joining specified pixel array co-ordinates to specify a shape and position of the feature.

* * * * *

UNITED STATES PATENT AND TRADEMARK OFFICE

CERTIFICATE OF CORRECTION

PATENT NO. : 7,492,377 B2
APPLICATION NO. : 10/151050
DATED : February 17, 2009
INVENTOR(S) : Martin J. Edwards It is certified that error appears in the above-identified patent and that said Letters Patent is hereby corrected as shown below:

In claim 2, column 11, line 23, after “one” delete “or” and insert -- of --

In claim 2, column 11, line 25, after “one” delete “or” and insert -- of --

In claim 3, column 11, line 30, after “one” delete “or” and insert -- of --

In claim 5, column 12, line 2, after “one” delete “or” and insert -- of --

In claim 5, column 12, line 4, after “one” delete “or” and insert -- of --

In claim 6, column 12, line 7, after “one” delete “or” and insert -- of --

Signed and Sealed this

Twenty-first Day of July, 2009

John Doll

JOHN DOLL
*Acting Director of the United States Patent and Trademark Office*